(12) United States Patent
Chung et al.

(10) Patent No.: US 6,548,806 B1
(45) Date of Patent: Apr. 15, 2003

(54) APPARATUS FOR MONITORING FREQUENCY OF WDM SIGNALS USING PILOT TONE

(75) Inventors: Yun Chur Chung, Taejun (KR); Seung Kyun Shin, Taejun (KR); Keun Joo Park, Mokpo (KR)

(73) Assignee: Korea Advanced Institute Science and Technology, Taejun (KR)

( * ) Notice: Subject to any disclaimer, the term of this patent is extended or adjusted under 35 U.S.C. 154(b) by 0 days.

(21) Appl. No.: 09/517,789

(22) Filed: Mar. 2, 2000

(30) Foreign Application Priority Data

Mar. 12, 1999 (KR) ............................................. 99-8384

(51) Int. Cl.[7] ............................................. G01N 21/25
(52) U.S. Cl. .................. 250/227.23; 359/110; 359/124
(58) Field of Search ..................... 250/227.23; 359/110, 359/124, 130, 134; 356/73.1

(56) References Cited

U.S. PATENT DOCUMENTS 5,825,792 A    10/1998    Villeneuve et al. ........... 372/32
6,262,822 B1 *   7/2001    Obhi et al. .................. 359/130

OTHER PUBLICATIONS

Otsuka, K. et al., A High–Performance Optical Spectrum Monitor with High–Speed Measuring Time fro WDM Optical Networks, ECOC 97, Sep. 1997: pp. 22–25.

Teshima, M. et al., "Multiwavelength Simultaneous Monitoring Circuit Employing Wavelength Crossover Properties of Arrayed–Waveguide Grating", Electronics Letters, vol. 31 (No. 18): pp. 1595–1597.

G. R. Hill et al., "A Transport Network Layer Based on Optial Network Elements", Journal of Lightwave Technology, vol. 11 (No. 5/6): pp. 667–679.

* cited by examiner

Primary Examiner—Que T. Le
Assistant Examiner—Thanh X. Luu
(74) Attorney, Agent, or Firm—Akin, Gump, Strauss, Hauer & Feld, L.L.P.

(57) ABSTRACT

An apparatus monitoring frequency of WDM signals using pilot tone and two interleaved solid etalon filters for efficient management and maintenance of wavelength division multiplexing optical transmission network is provided. Desirably, the apparatus for optical frequency monitoring includes splitting means, a plurality of optical filtering means, optical detecting means, and frequency detecting means. The splitting means splits optical signal and the optical signal includes pilot tone. The plurality of optical filtering means filters an output of the splitting means with particular passband. The optical detecting means converts an output of the optical filtering means into electrical signal. The frequency detecting means detects an intensity of the pilot tone from an output of the optical detecting means and calculates optical frequency.

10 Claims, 7 Drawing Sheets

APPARATUS FOR MONITORING FREQUENCY OF WDM SIGNALS USING PILOT TONE

TECHNICAL FIELD

The present invention relates to an apparatus for monitoring frequency of WDM signals. In particular, the present invention relates to an apparatus monitoring frequency of WDM signals using pilot tone and two interleaved solid etalon filters for efficient management and maintenance of wavelength division multiplexing optical transmission network.

BACKGROUND OF THE INVENTION

Optical transmission networks with wavelength division multiplexing employ a number of lasers of different wavelengths in order to increase transmission capacity of each optical fiber.

In Optical transmission networks with wavelength division multiplexing scheme, even though lasers operate on low transmission speed, transmission capacity per optical fiber can be dramatically increased. Therefore, conventional optical fibers that are already installed don't need to be replaced.

However, since multiplexers and demultiplexers are sensitive to frequency of each channel and output level of each channel is heavily related with overall performance of system in wavelength division multiplexing optical transmission network, the frequency monitoring equipment is necessary for efficient management of optical transmission network.

Conventional methods to monitor frequency of optical signals employ two optical filters with interleaved transmission characteristics and intensities of optical signals passed the optical filters are compared.

The conventional methods can be used with single channel systems but cannot be applied to multiple channel systems like systems with wavelength division multiplexing technique.

Conventional frequency monitoring methods for multiple channel systems include a method using channel crossover characteristic of AWG (arrayed-waveguide grating) and a method using AOTF (accusto-optic tunable filter).

However, the method using channel selection characteristic of AWG requires expensive ANG and the method using AOTF is not able to monitor frequency and optical output at systems with 100 GHz channel since bandwidth of AOTF is bigger than 1 nm.

SUMMARY OF THE INVENTION

An apparatus monitoring frequency of WDM signals using pilot tone and two interleaved solid etalon filters for efficient management and maintenance of wavelength division multiplexing optical transmission network is provided.

Desirably, the apparatus for optical frequency monitoring includes splitting means, a plurality of optical filtering means, optical detecting means, and frequency detecting means. The splitting means splits optical signal and the optical signal includes a pilot tone. The plurality of optical filtering means filters an output of the splitting means with particular passbands. The optical detecting means converts an output of the optical filtering means into an electrical signal. The frequency detecting means detects an intensity of the pilot tone from an output of the optical detecting means and calculates optical frequency.

Desirably, the frequency detecting means includes analog-digital converting means, fast Fourier transforming means, and frequency calculating means. The analog-digital converting means converts the output of the optical detecting means into a digital signal. The fast Fourier transforming means performs fast Fourier transform on the digital signal. The frequency calculating means measures the intensity of the pilot tone from an output of the fast Fourier transforming means and calculates frequency from the intensities of the pilot tone.

Desirably, the frequency detecting means includes electrical filtering means, power detecting means, and frequency calculating means. The electrical filtering means passes the corresponding pilot tone of optical signal from the output of the optical detecting means. The power detecting means converts intensity of the pilot tone from an output of the electrical filtering means into the voltage. The frequency calculating means calculates frequency from the voltage from the power detecting means.

Desirably, the frequency calculating means calculates frequency by using the ratio of the intensities of the pilot tone.

Desirably, frequency calculating calculates frequency by using difference of the intensities of the pilot tone.

Desirably, the optical filtering means is a plurality of filters having interleaved transmission characteristics.

Desirably, the optical filtering means is a solid Fabry-Perot etalon filter and transmission characteristics of the Fabry-Perot etalon filter have periodical characteristics in response to wavelength of optical signal.

Desirably, the optical filtering means is an optical fiber Fabry-Perot etalon filter and transmission characteristics of the optical fiber Fabry-Perot etalon filter have periodical characteristics in response to wavelength of optical signal.

Desirably, the optical filtering means is an arrayed-waveguide grating and resonant frequency of the arrayed-waveguide grating is similar to channel of wavelength division multiplexed signal.

Desirably, the optical filtering means is an optical filter and the optical filter operates with frequency range of wavelength division multiplexed optical signal.

BRIEF DESCRIPTION OF THE DRAWINGS

The embodiments of the present invention will be explained with reference to the accompanying drawings, in which.

DETAILED DESCRIPTION OF THE INVENTION

Figure 1:
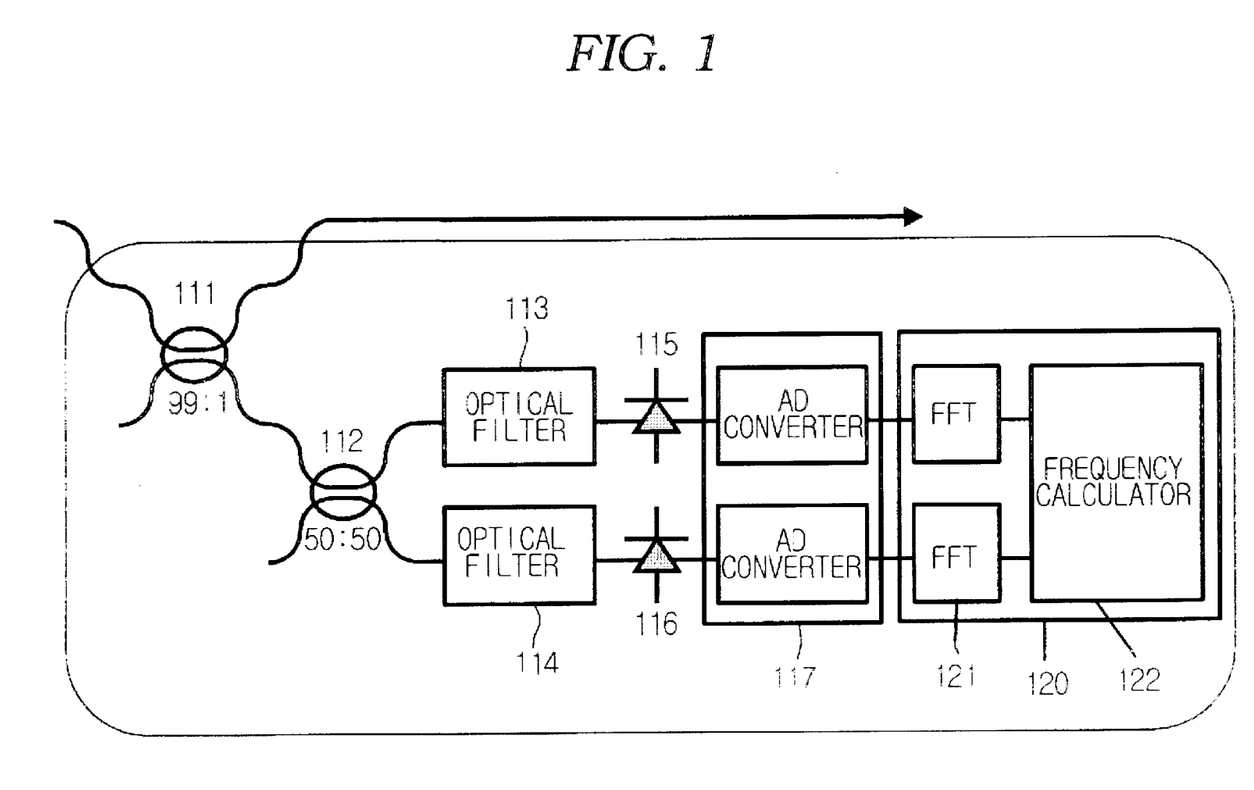
FIG. 1 is a diagram illustrating an apparatus for monitoring frequency using optical filters of interleaved transmission characteristics in accordance with an embodiment of the present invention.

FIG. 1 is a diagram illustrating an apparatus for monitoring frequency using optical filters of interleaved transmission characteristics in accordance with an embodiment of the present invention.

The frequency monitoring device in accordance with an embodiment of the present invention includes a first star coupler ill, a second star coupler 112, a first optical filter 113, a second optical filter 114, a first photodetector 115, a second photodetector 116, an analog-digital converter 117, and a frequency detector 120.

The first star coupler 111 tabs optical signals supplied from optical path. The second star coupler 112 splits the optical signals supplied from the first star coupler 111. The first optical filter 113 and the second optical filter 114 have the interleaved transmission characteristics and perform optical signal filtering. The first photodetector 115 and the second photodetector 116 convert the optical signals supplied from the first optical filter 113 and the second optical filter 114 into the electrical signals. The analog-digital converter 117 converts the electrical signals into digital signals. The frequency detector 120 receives the digital signals and detects frequency.

The frequency detector 120 includes fast Fourier transformer 121 and frequency calculator 122.

The fast Fourier transformer 121 performs Fourier transform on signals supplied from the analog-digital converter 117. The frequency calculator 122 detects frequency from the signal supplied from the fast Fourier transformer 121.

The optical frequency monitor in accordance with an embodiment of the present invention operates as follows.

The first star coupler 111 is connected with optical path and tabs a part of optical signal, which includes pilot tone allocated for each optical channel.

The second star coupler 112 receives output of the first star coupler 111 and splits it.

That is, the first star coupler 111 tabs only 1% of optical signal advancing through optical path and passes the rest 99%. The second star coupler 112 evenly splits the optical signal from the first star coupler.

The evenly split optical signals are sent to the first optical filter 113 and the second optical filter 114. Desirably, two optical filters with interleaved transmission characteristics can implement the optical filters 113, 114.

Also, two solid Fabry-Perot etalon filters can implement the optical filters 113, 114. The two solid Fabry-Perot etalon filters have periodical transmission characteristics on the basis of wavelength of optical signal.

Also, two optical fiber Fabry-Perot etalon filters can implement the optical filters 113, 114. The two optical fiber Fabry-Perot etalon filters have periodical transmission characteristics on the basis of wavelength of optical signal.

Also, AWGs can implement the optical filters 113, 114. The crossover frequency of the neighboring channels of the AWGs is similar to the frequency of the wavelength division multiplexed signal.

Also, optical filters can implement the optical filters 113, 114. The optical filters operate with frequency range of the wavelength division multiplexed optical signal.

Figure 2:
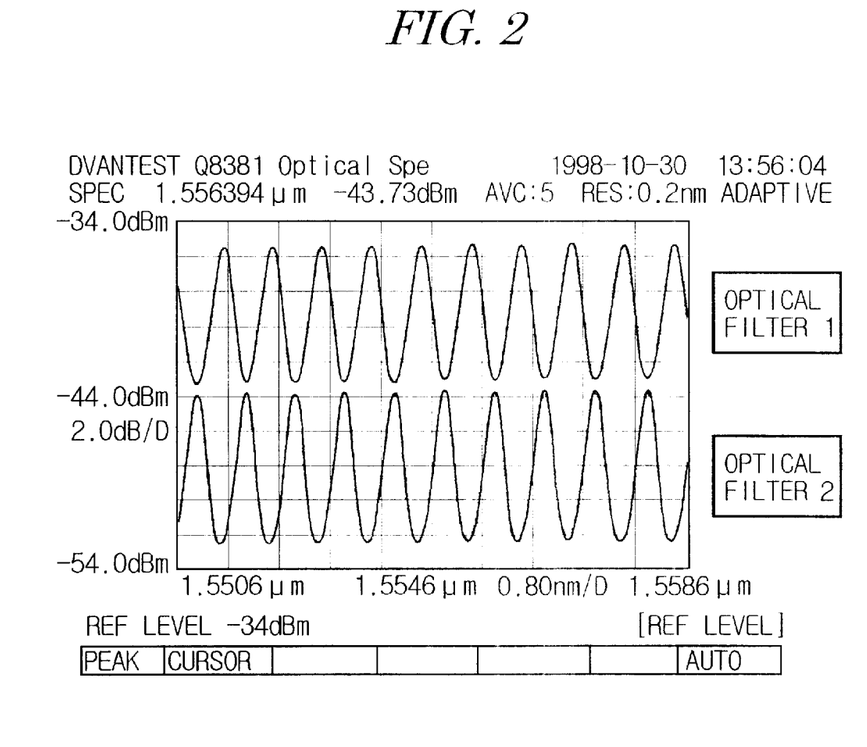
FIG. 2 is a graph illustrating characteristics of optical filters that have interleaved transmission characteristics.

FIG. 2 is a graph illustrating characteristics of optical filters that have interleaved transmission characteristics.

The optical frequency at the maximum transmittance of the first optical filter is identical with the optical frequency at the minimum transmittance of the second optical filter.

Therefore, the intensities of the optical signal passed through the first optical filter and the second optical filter are changed in accordance with frequency of the optical signal. As the intensities of the optical signal decrease, the intensities of pilot tone decrease.

The etalon filter can be implemented by silica glass and both sides of the silica glass are coated. Since characteristics of the etalon filter changes in accordance with temperature, temperature of the etalon filter is controlled to maintain a certain value by thermoelectric cooler and thermistor.

The first photodetector 115 and the second photodetector 116 detect the intensities of optical signals supplied from the first optical filter 113 and the second optical filter 114, respectively.

The analog-digital converter 117 receives analog signal and converts the analog signal into digital signal. The frequency detector 120 received the digital signal and detects frequency of the digital signal.

That is, the frequency detector 120 performs fast Fourier transform using the fast Fourier transformer 121 and then the frequency calculator 122 measures the to calculate intensities of pilot tone of optical signal optical frequency.

The frequency calculator 122 can measure the frequency of optical signal either by the ratio or the difference of intensities of pilot tone of optical signals.

Figure 3:
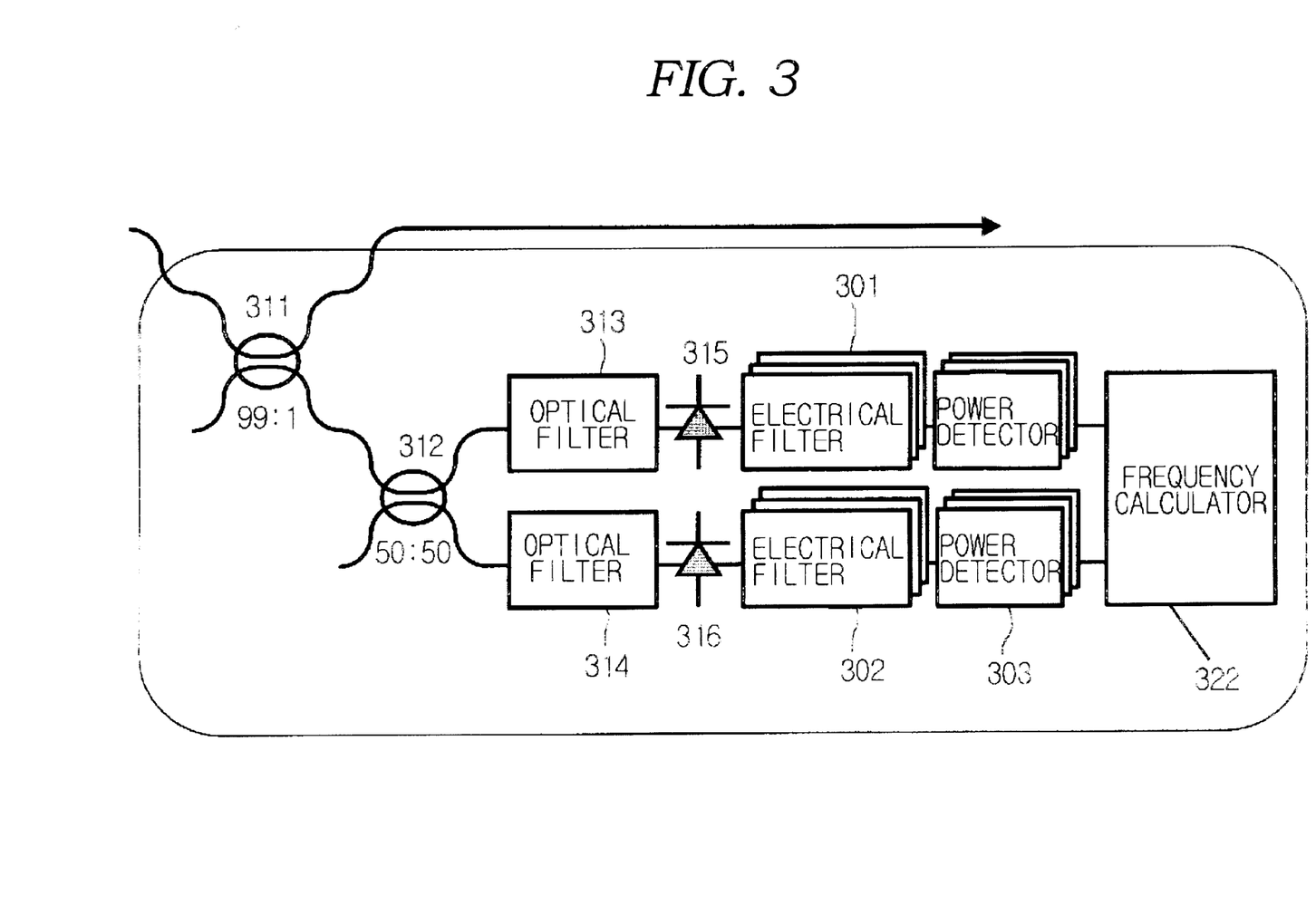
FIG. 3 is a diagram illustrating an apparatus for monitoring frequency using optical filters of interleaved transmission characteristics in accordance with an embodiment of the present invention.

FIG. 3 is a diagram illustrating an apparatus for monitoring frequency using optical filters of interleaved transmission characteristics in accordance with an embodiment of the present invention. The optical frequency monitor of FIG. 3 includes first star coupler 311, second star coupler 312, first optical filter 313, second optical filter 314, first photodetector 315, second photodetector 316, electrical filters 301, 302, power detector 303, and frequency calculator 322.

The first star coupler 311 tabs optical signals supplied from optical path. The second star coupler 312 splits the optical signals supplied from the first star coupler 311. The first optical filter 313 and the second optical filter 314 have interleaved transmission characteristics and perform optical signal filtering. The first photodetector 315 and the second photodetector 316 detect intensities of optical signals supplied from the first optical filter 313 and the second optical filter 314. The electrical filter arrays 301 and 302 extract each pilot tone from the outputs of the photodetectors 315, 316. The power detector arrays 303 measure intensities of the pilot tones. The frequency calculator 322 calculates frequency on the basis of the intensity of the pilot tone.

The operations of the first star coupler 311, the second star coupler 312, the first optical filter 313, the second optical filter 314, the first photodetector 315, and the second photodetector 316 are same as operations of those devices previously described with an embodiment shown in FIG. 1.

The electrical filter arrays 301 and 302 filter off the other pilot tones except the corresponding pilot tone of optical signal from the output of the photodetectors 315 and 316. The power detector arrays 303 convert the intensities of the pilot tone into the voltages.

The frequency calculator 322 calculates optical frequency on the basis of the intensity of the pilot tone. The frequency calculator 322 can measure the frequency of optical signal either by ratio of measured optical power or by difference of measured optical powers.

Figure 4:
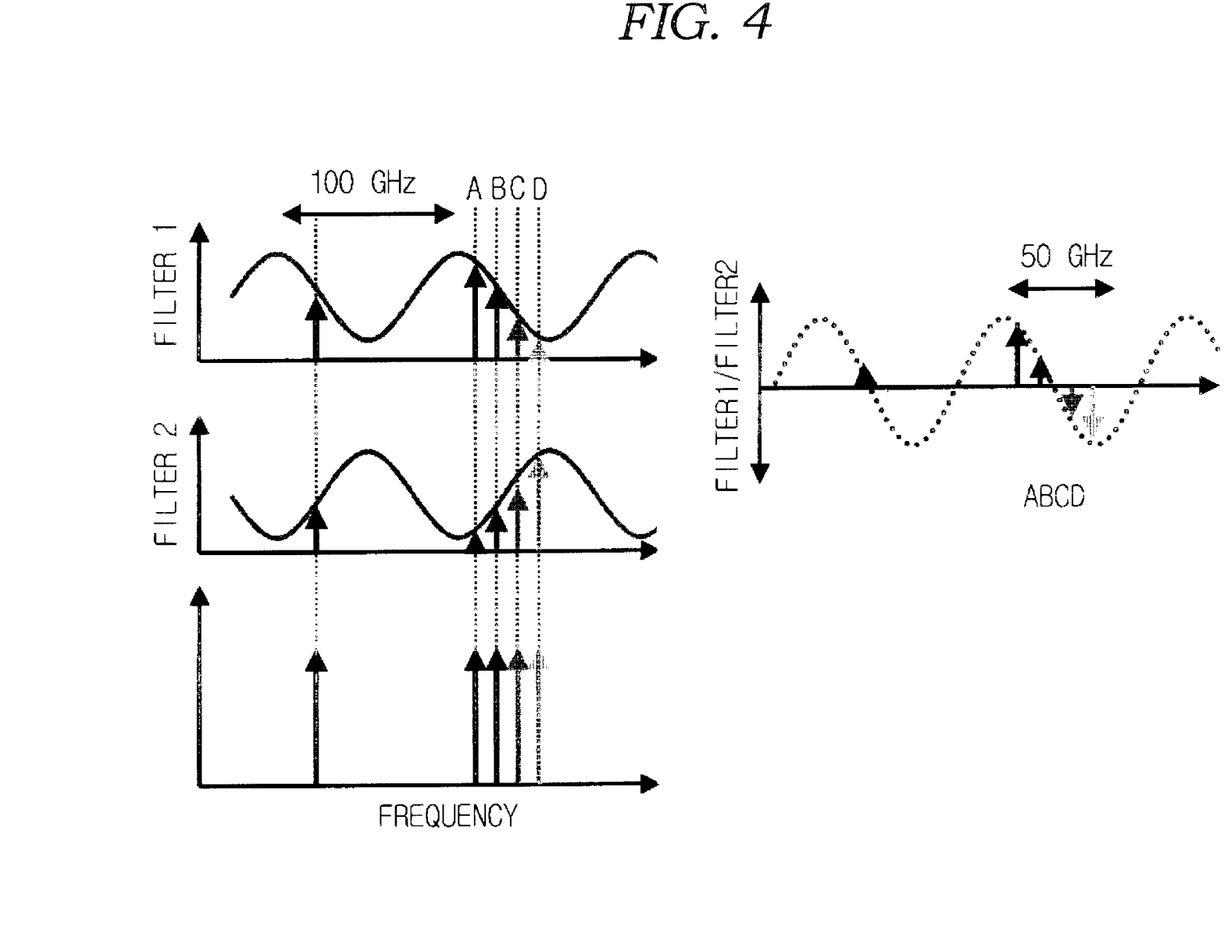
FIG. 4 shows graphs to explain operating principles of the present invention.

FIG. 4 shows graphs to explain operating principles of the present invention.

Since optical signals pass through optical filters 313, 314 with interleaved transmission characteristics, optical signals of A, B, C, and D have different intensities.

If difference in intensity between two signal passed through the first and second optical filters 313 and 314 are known, it can be also known where the signal is located in frequency among A, B, C, and D.

However, frequency of multiple optical signals cannot be obtained from the intensity information of optical signals and therefore pilot tone is used to distinguish each optical signal which has different optical frequency.

As intensity of optical signals passed through the first optical filter 313 and the second optical filter 314 changes, intensity of corresponding pilot tone also changes. Therefore, frequency information of the optical signal can be obtained from the intensity of pilot tone. The pilot tone is detected after analog-digital conversion and fast Fourier transform are applied to the optical signal.

If etalon filters are used, the first optical filter 313 and the second optical filter 314 have same characteristics of period. Therefore, each period can be applied to each optical signal of different wavelength and frequency of multiple optical signals can be measured at the same time.

Frequency range of measurement is half of the period of the etalon filter.

That is, if the period of the etalon filter is 100 GHz, the frequency range is 50 GHz, which is half of the period of optical filters.

Figure 5:
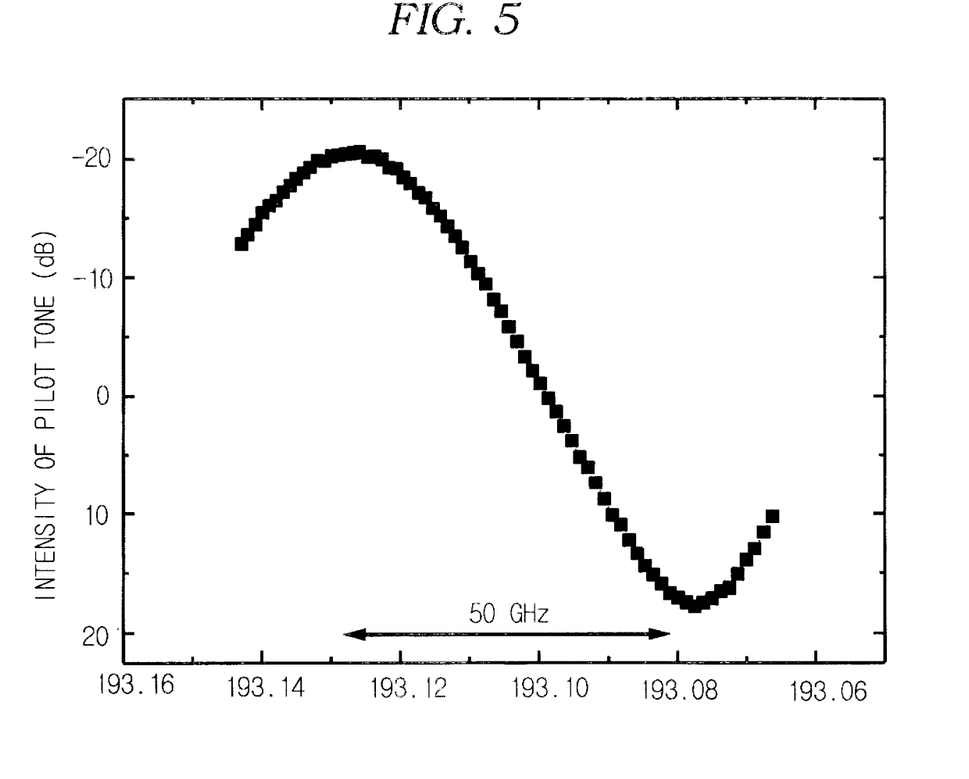
FIG. 5 is a graph illustrating the ratio of the intensity of pilot tone with respect to frequency of optical signal, the optical signal measured with optical filters of interleaved transmission characteristics.

FIG. 5 is a graph illustrating the ratio of intensity of pilot tone with respect to optical frequency of the signal, which is passed through the two interleaved optical filters. The frequency of optical signal superimposed by pilot tone is changed from 193.14 THz to 193.06 THz. Intensity of the optical signal passed through optical filters is measured by comparing intensity of pilot tone.

It is shown that ratio of pilot tone intensity is linearly decreased with the frequency from 193.08 THz 30 to 193.13 lHz in FIG. 5.

Figure 6:
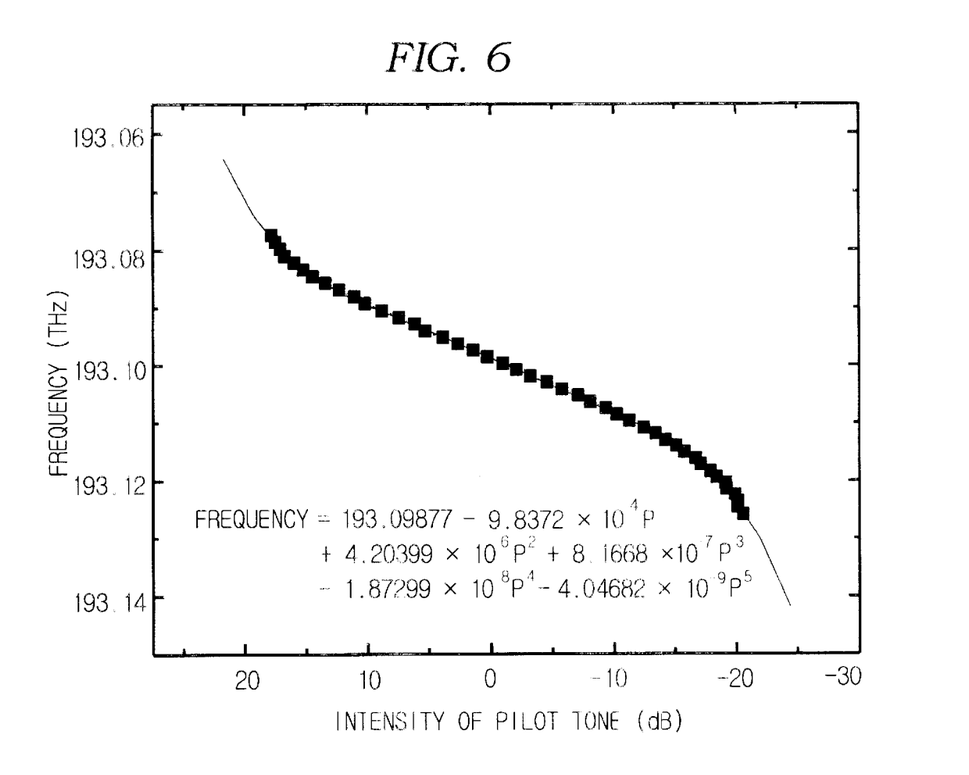
FIG. 6 is a graph illustrating the process to extract frequency by inverse function of FIG. 5.

FIG. 6 is a graph illustrating the process to extract frequency by inverse function of FIG. 5.

Therefore, frequency of input optical signal can be known by the ratio of pilot tone intensity.

The frequency of optical signals can be calculated from the ratio of pilot tone intensity by following mathematical equation 1.

$$F=193.09877-9.8372\times10^{-4}P+4.20339\times10^{-6}P^2+8.1668\times10^{-7}P^3-1.87299\times10^{-8}P^4-4.04682\times10^{-9}P^5$$ [Equation 1]

F: frequency of optical signal in THz
P: intensity of pilot tone in dBm

Figure 7:
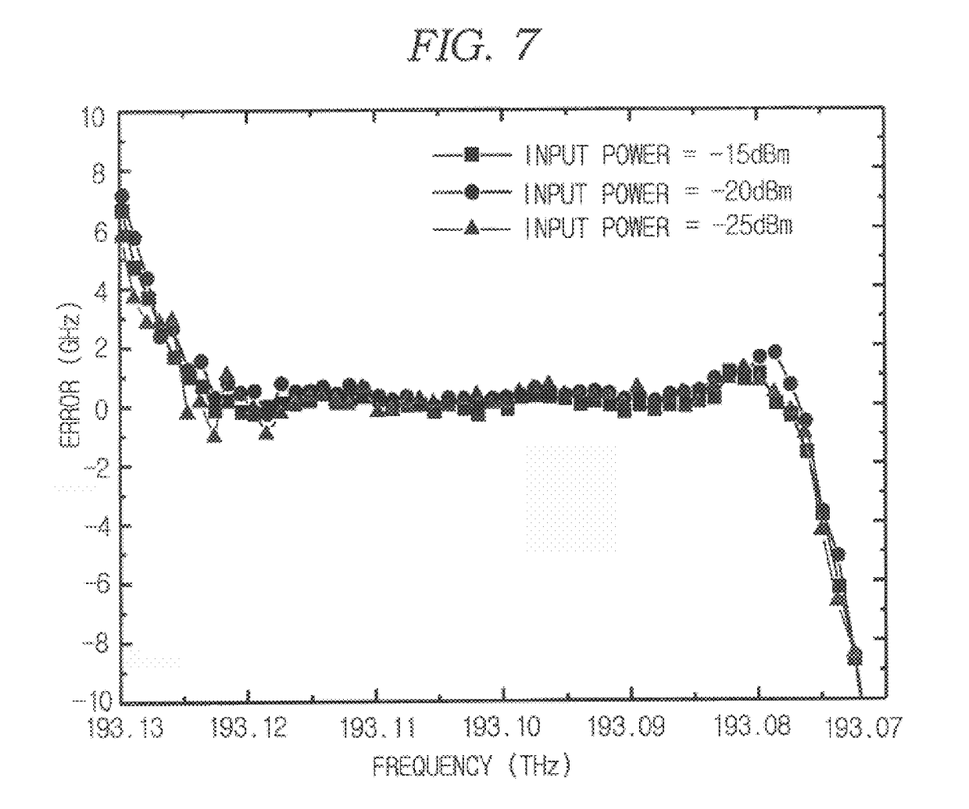
FIG. 7 is a graph illustrating experimental result of frequency measurement in accordance with the present invention.

FIG. 7 is a graph illustrating experimental result of frequency measurement in accordance with the present invention. FIG. 7 shows error between frequency of optical signals measured by the optical frequency monitor and frequency of optical signals measured by optical frequency meter.

FIG. 7 shows that it is possible to measure within ± 1 GHz under 50 dB range with input variance from −15 dBm to −25 dBm.

In wavelength division multiplexing optical transmission system, the optical frequency monitor in accordance with the present invention employs etalon filters whose transmission characteristic is contrary to pilot tone. Therefore, the optical frequency monitor detects frequency of a number of optical signals simultaneously. The optical frequency monitor doesn't have dynamic part and measures accurate frequency with simple algorithm and consequently, economical frequency monitoring is possible in wavelength division multiplexing optical transmission network.

Although representative embodiments of the present invention have been disclosed for illustrative purpose, those who are skilled in the art will appreciate that various modifications, additions and substitutions are possible without departing from the scope and spirit of the present invention as defined in the accompanying claims.

What we claim:

1. An apparatus for monitoring frequency of an optical signal, said optical signal including a plurality of wavelength-division-multiplexed (WDM) channels, each of said WDM channels having a corresponding pilot tone, wherein each pilot tone is a low-frequency sinusoidal signal with a distinct frequency, said apparatus comprising:

splitting means for splitting said optical signal into two optical path signals, each of said optical path signals including said corresponding pilot tone;

optical filtering means connected to said splitting means, said optical filtering means for filtering each pilot tone of said two optical path signals with particular passbands and outputting two filtered pilot tones;

optical detecting means connected to said optical filtering means, said optical detecting means for converting said two filtered pilot tones into two electrical signals; and frequency detecting means comprising a pilot tone detecting means and an optical frequency calculating means, wherein said pilot tone detecting means detects the intensities of said two filtered pilot tones based on said electrical signals, and said optical frequency calculating means calculates the optical frequency of each WDM channel based on intensities of said two filtered pilot tones detected by said pilot tone detecting means for each WDM channel.

2. The apparatus of claim 1, wherein said pilot tone detecting means comprises:

analog-digital converting means for converting the electrical signals into digital signals;

fast Fourier transforming means for processing the digital signals by performing fast Fourier transforms on the digital signals; and intensity detecting means for measuring the intensities of the two filtered pilot tones based on the processed digital signals.

3. The apparatus of claim 1, wherein said pilot tone detecting means comprises:

electrical filtering means for passing the electrical signals corresponding to the two filtered pilot tones from outputs of the optical detecting means; and intensity detecting means for converting the intensities of the two filtered pilot tones into voltage signals, wherein said optical frequency calculating means calculates the frequency of the optical signal based on the voltage signals.

4. The apparatus of claim 1, wherein the optical frequency calculating means calculates the optical frequency of each WDM channel using a ratio between the intensities of said two filtered pilot tones.

5. The apparatus of claim 1, wherein the optical frequency calculating means calculates the optical frequency of each WDM channel based on a difference between the intensities of said two filtered pilot tones.

6. The apparatus of claim 1, wherein said optical filtering means comprises a plurality of filters having interleaved transmission characteristics.

7. The apparatus of claim 1, wherein said optical filtering means comprises a solid Fabry-Perot etalon filter, wherein transmission characteristics of the solid Fabry-Perot etalon filter have periodical characteristics in response to the optical frequencies of said WDM channels.

8. The apparatus of claim 1, wherein said optical filtering means comprises an optical fiber Fabry-Perot etalon filter, wherein transmission characteristics of the optical fiber Fabry-Perot etalon filter have periodical characteristics in response to the optical frequencies of said WDM channels.

9. The apparatus of claim 1, wherein the optical filtering means comprises an arrayed-waveguide grating, wherein a resonant frequency of the arrayed-waveguide grating is substantially equivalent to a frequency difference between said WDM channels.

10. The apparatus of claim 1, wherein the optical filtering means comprises an optical filter, wherein the optical filter operates in an optical frequency range of said WDM channels.

\* \* \* \* \*